United States Patent
Hoffmann et al.

(10) Patent No.: US 6,251,972 B1
(45) Date of Patent: *Jun. 26, 2001

(54) PROCESS FOR THE STABILIZATION OF AND STABILIZER MIXTURES FOR SINGLE-MATERIAL RECYCLED PLASTICS

(75) Inventors: Kurt Hoffmann, Lautertal; Heinz Herbst, Lautertal-Reichenbach; Rudolf Pfaendner, Rimbach/Odenwald, all of (DE); Franciszek Sitek, Therwil (CH)

(73) Assignee: Ciba Specialty Chemicals Corp., Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/403,913

(22) PCT Filed: Sep. 14, 1993

(86) PCT No.: PCT/EP93/02487

§ 371 Date: Mar. 21, 1995

§ 102(e) Date: Mar. 21, 1995

(87) PCT Pub. No.: WO94/07951

PCT Pub. Date: Apr. 14, 1994

(30) Foreign Application Priority Data

Sep. 25, 1992 (CH) .................................................. 3010/92

(51) Int. Cl.[7] .................................................. C08K 5/51
(52) U.S. Cl. ................ 524/128; 106/286.6; 106/287.23; 106/287.24; 106/287.26; 106/287.29; 252/400.61; 252/400.2; 524/108; 524/109; 524/126
(58) Field of Search ..................................... 524/108, 109, 524/126, 128; 106/286.6, 287.23, 287.24, 287.26, 287.29; 252/182.12, 182.14, 183.12, 183.13, 400.61, 400.2

(56) References Cited

U.S. PATENT DOCUMENTS

| 4,443,572 | * | 4/1984 | Burns ..................................... 524/120 |
| 4,590,231 | * | 5/1986 | Seltzer et al. ......................... 524/100 |
| 4,829,110 | * | 5/1989 | Van Asbroeck et al. ......... 524/126 X |
| 4,829,112 | * | 5/1989 | Ishii et al. ......................... 524/126 X |
| 4,876,300 | * | 10/1989 | Seltzer et al. ......................... 524/100 |
| 5,017,633 | * | 5/1991 | Tscheulin ............................. 524/117 |
| 5,023,286 | * | 6/1991 | Abe et al. ............................ 524/128 |
| 5,086,100 | * | 2/1992 | Fukui et al. ..................... 524/128 X |
| 5,149,774 | * | 9/1992 | Patel et al. ............................ 528/492 |
| 5,158,992 | * | 10/1992 | Caselli et al. ..................... 524/126 X |
| 5,298,540 | * | 3/1994 | Pauquet et al. ................... 524/126 X |
| 5,298,541 | * | 3/1994 | Bohshar et al. ....................... 524/126 |
| 5,300,257 | * | 4/1994 | Akoshi et al. ................... 524/126 X |
| 5,308,902 | * | 5/1994 | Andreas et al. ....................... 524/128 |

FOREIGN PATENT DOCUMENTS

| 0202346 | * | 12/1982 | (JP) . |
| 2223248 | * | 10/1987 | (JP) ..................................... 524/126 |
| 0020249 | * | 1/1989 | (JP) . |

OTHER PUBLICATIONS

P. Vink, et al., Polymer Degradation and Stability 9 (1984) 133–144.

C.A. 100: 193015y (1984).

C.A. 102: 167333x (1985).

* cited by examiner

*Primary Examiner*—Judy M. Reddick
(74) *Attorney, Agent, or Firm*—Luther A. R. Hall; David R. Crichton

(57) ABSTRACT

Single-material recycled thermoplastics from commercial and industrial waste can be stabilized against thermal oxidative degradation by adding a combination of a sterically hindered phenol with an organic phosphite or phosphonite and an inorganic compound from the series consisting of metal oxides, hydroxides and carbonates.

13 Claims, No Drawings

PROCESS FOR THE STABILIZATION OF AND STABILIZER MIXTURES FOR SINGLE-MATERIAL RECYCLED PLASTICS

The invention relates to a process for the stabilization of single-material recycled plastics, as predominantly obtained from commercial or industrial waste, and to the stabilizer mixtures which can be used for this purpose.

The recycling of waste is a problem of increasing importance for ecological reasons. The recycling of paper, textiles, glass or metals is already carried out on a large scale, whether by separate collection or by sorting of the refuse. The recycling of plastic waste and used plastics is also an increasing aim. Thermoplastics are generally processed by re-melting.

However, the plastic waste produced in the household, in commerce or in industry or the plastic materials or used plastics obtained from collections or a return obligation, for example in specific sectors of industry, such as the automobile industry, electrical industry, agriculture or the packaging industry, predominantly comprises thermoplastics based on polyolefins, styrene polymers, polyvinyl chloride or polyethylene terephthalate.

These used plastics, which are, in addition, valuable raw materials, can be obtained either as a mixture or as a single material. Single-material plastic waste can be produced directly in the production of plastic parts or obtained by specific collections, if necessary after separation and purification.

Hitherto, plastic recyclates have predominantly only been used for purposes where relatively low strict demands are made, for example as fillers or where thick-walled parts are used, for example noise protection dams. However, the use of recyclates in demanding applications is now increasingly intended, in particular single-material recyclates being included in these considerations.

For the stabilization of recycled high-density polyethylene, P. Vink, R. T. Rotteveel and J. D. M. Wisse in Polymer Degr. and Stability, Issue 9, p. 133 (1984) studied various stabilizers from the classes of the phosphites, hindered phenols, benzotriazoles, hindered amines and phosphonites.

These authors also indicated that the recyclates must be re-stabilized. Although the plastics have mostly originally been treated with stabilizers against thermooxidative and in some cases also against photooxidative degradation, these stabilizers are lost during use of the plastics, during storage of the waste and during processing of the recyclates, in some cases due to migration, extraction or by degradation. A recycled plastic differs structurally and also chemically from a new plastic as a consequence of the prior use or due to storage and processing; for example sites of attack for oxidative degradation may already have formed. A recycled plastic therefore requires, generally, a relatively large amount of stabilizers or alternatively stabilizers which take into account these particular circumstances. The difficulty of finding suitable stabilizers is due in particular to the type of previous damage, which may have taken place over an extended period.

From U.S. Pat. No. 4,443,572, JP-A-57/202,346, JP-A-01/020,249 and FR-A-2 528 056 it is known to use a mixture including a phenol, a pentaerythritol and a selected inorganic compound in certain virgin plastics.

Single-material recycled plastics can be obtained as production waste, for example film edge trim, sprue parts of plastic articles, pre- or post-production parts or reject parts, or in the case of separately disposed or sorted used materials, for example used automobile parts, such as battery casings or bumpers, or packaging materials, for example polystyrene foams.

It has now been found that single-material recycled plastics can be stabilized in a simple and economical manner against thermooxidative degradation by means of a mixture of stabilizers known per se, and can thus be converted in a variety of ways not only into serviceable products, but in particular into high-quality products.

Single-material plastics are taken to mean materials which comprise more than 98% of only one polymer or copolymer (for example ABS).

The invention relates to a process for the stabilization of single-material recycled thermoplastics, which can be obtained from commercial and industrial waste, which comprises adding from 0.01 to 15% by weight of a mixture of a) at least one sterically hindered phenol, b) at least one organic phosphite or phosphonate and c) at least one inorganic compound from the series consisting of metal oxides, hydroxides and carbonates.

The a:b weight ratio is preferably from 20:1 to 1:20, particularly preferably from 10:1 to 1:10, very particularly preferably from 4:1 to 1:4. The (a+b):c weight ratio is preferably from 10:1 to 1:20, particularly preferably from 5:1 to 1:10, very particularly preferably from 3:1 to 1:3.

The plastics to be stabilized are, for example, film waste, automobile battery casings, bottle crates or polystyrene foam.

The invention relates especially to the stabilization of single-material recycled plastics either from the polyolefins or from the polystyrenes.

In particular, the invention relates to the stabilization of single-material recycled plastics which comprise a polyolefin of which polyethylene, polypropylene and polypropylene copolymers are particularly preferred.

The polyolefins include, in particular, polyethylene (PE) and polypropylene (PP), in particular low-density polyethylene (LDPE), linear low-density polyethylene (LLDPE), high-density polyethylene (HDPE), ultra-low-density polyethylene (ULDPE) and medium density polyethylene (MDPE), and furthermore copolymers such as ethylene-propylene (EPM) and ethylene-propylene-diene (EPDM) copolymers.

Polystyrene (PS) is also taken to mean copolymers containing styrene, for example acrylonitrile-butadiene-styrene polymers (ABS).

Single-material recyclates may also contain, in small amounts, residues of other plastics or alternatively non-thermoplastics or foreign substances, for example paper, pigments and adhesives, which are frequently difficult to remove. These foreign substances may also originate from contact with diverse substances during use or processing, for example fuel residues, paint components, traces of metal, initiator residues or traces of water.

From 0.05 to 5% by weight of the mixture of a, b and c is preferably employed. From 0.1 to 2% by weight of the mixture of a, b and c is particularly preferably employed. From 0.1 to 1% by weight is very particularly preferably employed.

The sterically hindered phenols used as component a are known stabilizers against thermooxidative ageing of plastics, in particular polyolefins. These compounds preferably contain at least one group of the formula I

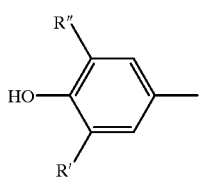

(I)

in which R' is hydrogen, methyl or tert-butyl and
R" is substituted or unsubstituted alkyl or substituted or unsubstituted thioether.

Examples of such sterically hindered phenols are:
2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl4-i-butylphenol, 2,6-dicyclopentyl-4-methylphenol, 2-(α-methylcyclohexyl)-4,6dimethylphenol, 2,6-dioctadecyl-4-methylphenol, 2,4,6-tricyclohexylphenol, 2,6-di-tert-butyl4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonyl-phenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethyl benzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithioterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate and the calcium salt of monoethyl 3,5-di-tert-butyl-4-hydroxybenzylphosphonate.

Component a is particularly preferably a compound containing at least one group of the formula

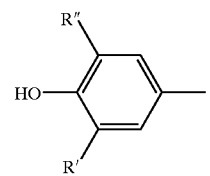

(I)

in which R' is methyl or tert-butyl; and
R" is substituted or unsubstituted alkyl or substituted or unsubstituted thioether.

Examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, and the amides of these acids, for example N,N'-bis(3,5-di-tert-butyl4-hydroxyphenyl-propionyl)hexamethylenediamine, N,N'-bis(3,5-di-tert-butyl-4-hydroxyphenyl-propionyl)trimethylenediamine and N,N'-bis(3,5-di-tert-butyl-4-hydroxyphenyl-propionyl) hydrazine.

Also particularly preferred are the following compounds:

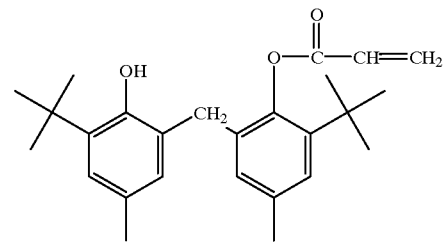

{2-(1,1 dimethylethyl)-6-[[3-( 1,1-dimethylethyl)-2-hydroxy-5-methylphenyl]-methyl]-4-methylphenyl 2-propenoate};

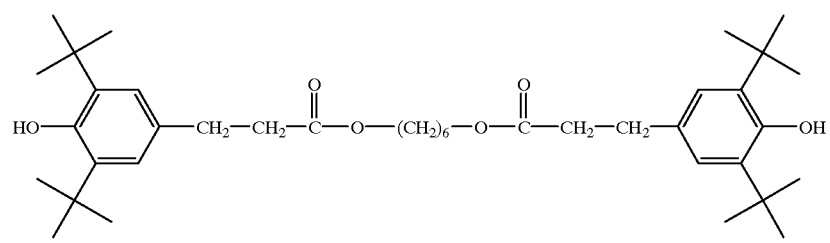

{benzenepropanoic acid 3,5-bis(1,1-dimethyl-ethyl)-4-hydroxy-1,6-hexanediylester};

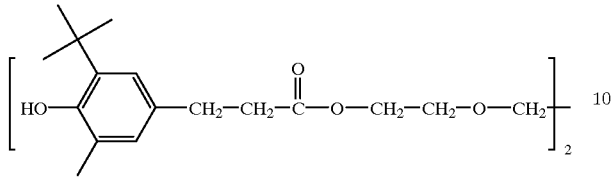

{(benzenepropanoic acid 3-(1,1-dimethylethyl)-4-hydroxy-5-methyl-1,2-ethanediylbis-(oxy-2,1-ethanediyl)ester};

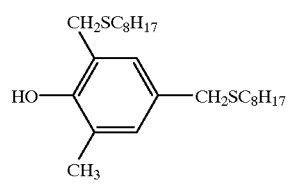

{2-methyl-4,6-bis[(octylthio)methyl]-phenol};

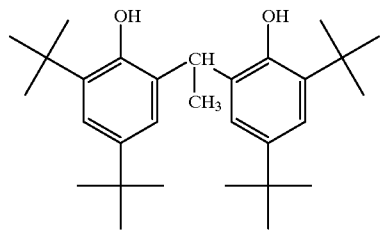

{2,2'-ethylidene-bis-(4,6-di-tert.butylphenol)};

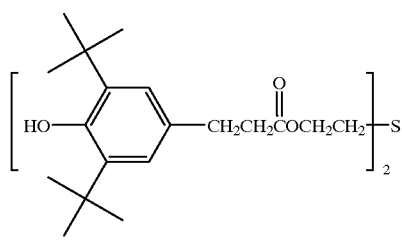

{benzenepropanoic acid 3,5-bis(1,1-dimethylethyl)-4-hydroxy-thiodi-2,1-ethanediylester};

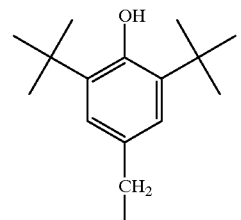

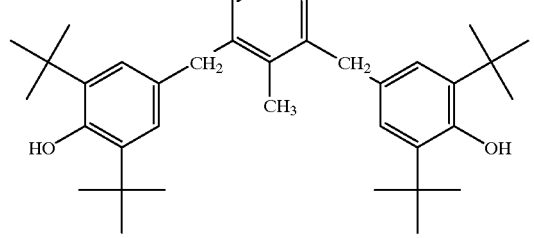

{4,4',4''-[(2,4,6-trimethyl-1,3,5-benzenetriyl)tris-(methylene]tris[2,6-bis(1,1-dimethylethyl)phenol)};

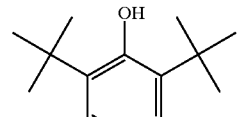

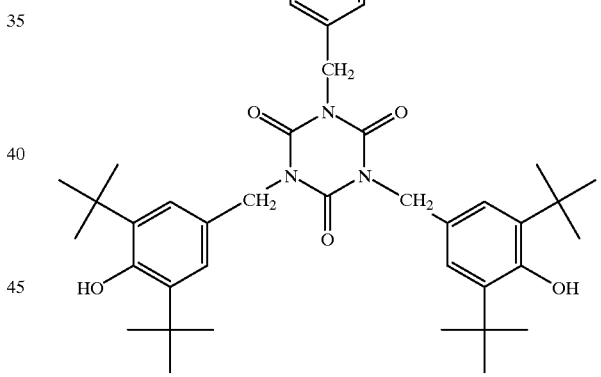

{1,3,5-tris[[3,5-bis(1,1-dimethylethyl)-4-hydroxyphenyl]methyl]-1,3,5-triazine-2,4,6(1H,3H,5H)-trione}.

Component a is most preferably a pentaerythritol ester or octadecyl ester of β-(3,5-di-tert-butyl-4-hydroxyphenyl) propionic acid or 2,2'-ethylidenebis(4,6-di-tert-butyl-phenol).

The organic phosphites and phosphonites used as component b are likewise known as stabilizers for plastics. They are used, in particular, as processing stabilizers for polyolefins.

They are predominantly aromatic phosphites and phosphonites, for example triphenyl phosphite, diphenyl alkyl phosphites, phenyl dialkyl phosphites, tris (nonylphenyl) phosphite, trilauryl phosphite, trioctadecyl phosphite, distearyl pentaerythrityl diphosphite, tris(2,4-ditert-butylphenyl) phosphite, distearyl pentaerythrityl diphosphite, bis(2,4-di-tert-butylphenyl) pentaerythrityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4, 6-tris-tert-butylphenoxy)-2,4,8,10-tetraoxa-3,9-diphosphaspiro[5,5]undecane and 2,2'-ethylidenebis(4,6-di-tert-butylphenyl) fluorophosphite.

Preferred compounds are tris-(2,4-di-tert.butylphenyl) phosphite;

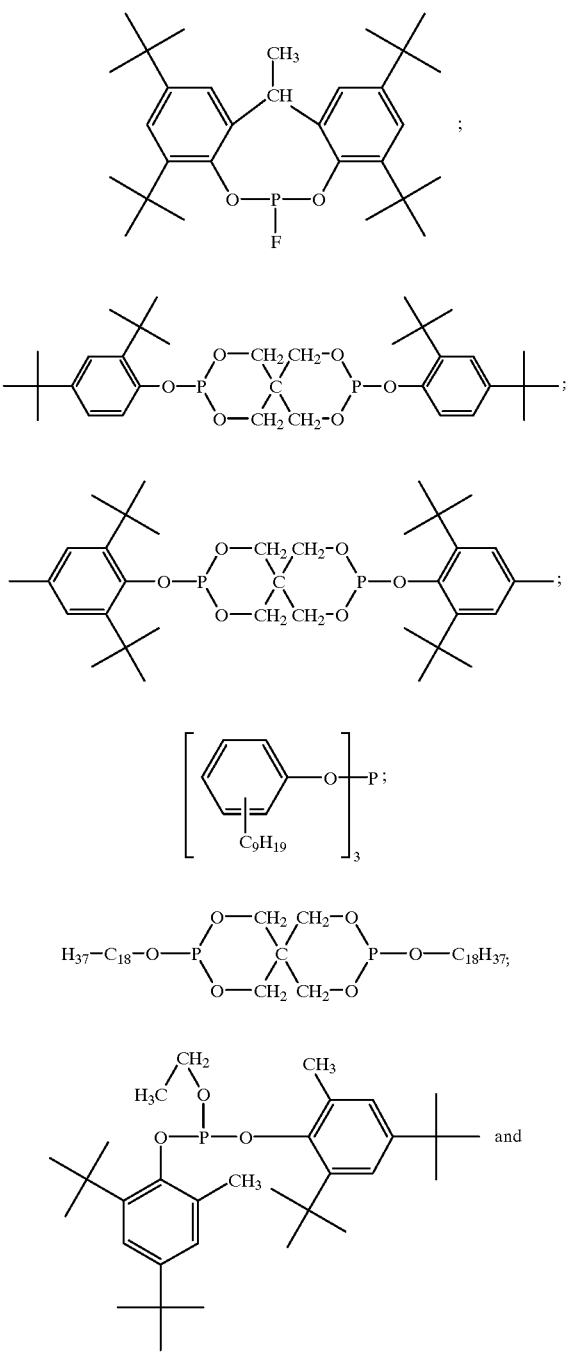

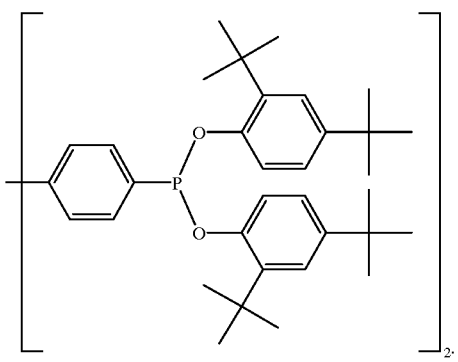

Component b is particularly preferably tris(2,4-di-tert-butylphenyl) phosphite.

Component c is an inorganic compound from the series consisting of metal oxides, hydroxides and carbonates.

These are in particular metal oxides, hydroxides or carbonates of elements from main group II or sub-group II, IV or VII. Preference is given to calcium, magnesium, zinc, titanium and manganese as metals, the oxides being particularly preferred, such as CaO MgO, ZnO, $TiO_2$, $MnO_2$ and very particularly calcium, magnesium and zinc oxide. Calcium oxide is most preferred.

It is also possible to use a mixture of various compounds for components a, b and c. For example, component c can be a mixture of calcium oxide and calcium carbonate.

An example which may be given of a metal hydroxide is magnesium hydroxide, and an example which may be given of a metal carbonate is calcium carbonate. It is also possible to use salts with different anions, for example magnesium aluminium hydroxycarbonates, known as hydrotalcites.

The present invention furthermore relates to stabilizer mixtures, and to the use thereof for the stabilization of single-material recycled thermoplastics which can be obtained from commercial and industrial waste, which mixtures comprise a) at least one sterically hindered phenol, b) at least one organic phosphite or phosphonate, and c) at least one inorganic compound from the series consisting of the metal oxides, hydroxides and carbonates.

Pariculalry preferred stabilizer mixtures comprise per 100 parts (by weight)

(A) as component a) 5–50 parts of the pentaerythrityl ester of β-(3,5-di-tert-butyl-4-hydroxyphenyl)propionic acid, as component b) 5–50 parts of tris-(2,4-di-tert-butylphenyl) phosphite and as component c) 5–90 parts of calcium oxide;

(B) as component a) 5–50 parts of the octadecyl ester of β-(3,5-di-tert-butyl-4-hydroxy-phenyl)propionic acid, as component b) 5–50 parts of tris-(2,4-di-tert-butylphenyl) phosphite and as component c) 5–90 parts of calcium oxide;

(C) as component a) 5–50 parts of 2,2'-ethyliden-bis-(4,6-di-tert-butylphenol), as component b) 5–50 parts of tris-(2,4-di-tert-butylphenyl) phosphite and as component c) 5–90 parts of calcium oxide;

(D) as component a) 10–30 parts of the octadecyl ester of β-(3,5-di-tert-butyl-4-hydroxy-phenyl)propionic acid, as component b) 10–30 parts of tris-(2,4-di-tert-butylphenyl) phosphite and as component c) 30–70 parts of calcium oxide; or (E) as component a) 5–30 parts of the octadecyl ester of β-(3,5-di-tert-butyl-4-hydroxy-phenyl)propionic acid, as component b) 5–30 parts of tris-(2,4-di-tert-butylphenyl) phosphite, as component c) 5–40 parts of calcium oxide, as well as 10–50 parts of calcium stearate.

The present invention furthermore relates to single-material recycled thermoplastics which can be obtained from commercial and industrial waste, containing a) at least one sterically hindered phenol, b) at least one organic phosphite or phosphonate and c) at least one inorganic compoand from the series consisting of metal oxides, hydroxides and carbonates.

Preferred single-material recycled thermoplastics, preferred stabilizer mixtures and the use thereof conform in their components and mixing ratios to the preferences described in greater detail under the process.

The addition of these combinations to the recyclate allows thermoplastic processing with reduced degradation and/or extends the service life of the materials produced from the recyclate.

The stabilizing action of the mixture of a, b and c, in particular the long-term stability, may be synergistically increased by the addition of so-called thiosynergists. These are aliphatic thioethers, in particular esters of thiodipropionic acid. Examples are the lauryl, stearyl, myristyl and tridecyl esters of thiodipropionic acid or distearyl disulfide. These thiosynergists are preferably used in an amount of from 0.1 to 1% by weight, based on the recyclate.

Other suitable stabilizers from the group consisting of the lactates, e.g. calcium lactate or calcium stearoyl-2-lactylate, and lactones, e.g.

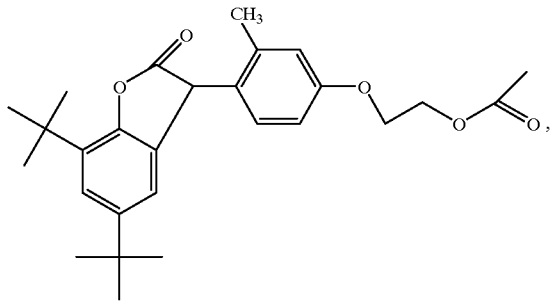

can likewise be added.

If high light stability is also required of the article produced from the recyclate, the addition of one or more light stabilizers is advisable. Suitable light stabilizers are, in particular, those from the series consisting of the benzophenones, benzotriazoles, oxanilides and sterically hindered amines. Examples of such compounds are:

2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzo-triazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2 -ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyl-oxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-di-phenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl4-lauroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl)sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl- 1,3,8-triazasprio[4.5]decane-2,4-dion, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediarnine and 4-morpholino-2,6-dichloro-1,3,5-triazine, the condensate of 2-chloro-4,6-bis (4-n-butyl-amino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione.

2.7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy4-octyloxyphenyl)-4,6-bis(4-methylphenyl)-1,3,5-triazine, 2-(2-hydroxy4-dodecyloxyphenyl)-4,6-bis(2,4-dimethylphenyl)- 1,3,5-triazine, 2-[2-hydroxy-4-(2hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

The light stabilizers are preferably added in an amount of from 0.01 to 2% by weight, in particular from 0.05 to 0.5% by weight, based on the plastic mixture. The light stabilizer used is preferably a combination of a benzotriazole with a sterically hindered amine.

If required, further conventional plastic additives can be added to the recycled plastic mixture, for example fillers, such as sawdust or mica, reinforcing agents, such as glass fibres, glass beads or mineral fibres, pigments, plasticizers, lubricants, such as metal stearates or laurates, flameproofing agents, antistatics or blowing agents. These additives depend on the intended use of the recyclate. In a preferred embodiment, the lubricant used is calcium stearate.

The recyclates stabilized in this way can be used for a very wide variety of applications, for example for tubes, profiles, sheets, cable insulations, sports equipment, garden furniture, films, automobile battery casings, construction parts, parts of vehicles and machines and containers of all types, for example bottles.

The recyclate can also be mixed with single-material new plastics or employed together with single-material new plastics, for example in a coextrusion process.

The examples below illustrate the novel process and stabilizer mixture in greater detail. As in the remainder of the description, parts are parts by weight and percentages are per cent by weight, unless otherwise stated.

EXAMPLES 1–3

Used plastic material (PP originating from used battery casings) in the form of granules is homogenized with the stabilizers (Table 1) in a screw mixer and subsequently extruded five times one after the other in a twin-screw compounder (temperature 260° C.). The melt flow index (MFI, 230° C., 2.16 kg) is determined in accordance with DIN 53 735M (ISO 1133/12) before the extrusions and after the 1st, 3rd and 5th extrusions.

TABLE 1

| | Stabilizer mixture | Melt flow index after | | | |
| --- | --- | --- | --- | --- | --- |
| | | 0 | 1st extrusion | 3rd extrusion | 5th extrusion |
| — | no stabilizer | 10.6 | 14.6 | 18.7 | 25.2 |
| Ex. 1 | 0.06% AO-1 + 0.14% P-1 + 0.5% M-1 | 10.6 | 10.4 | 11.0 | 12.4 |
| Ex. 2 | 0.06% AO-1 + 0.14% P-1 + 1.0% M-1 | 10.6 | 10.5 | 12.0 | 12.3 |
| Ex. 3 | 0.16% AO-1 + 0.04% P-1 + 0.5% M-1 | 10.6 | 10.5 | 12.5 | 13.0 |

The samples stabilized according to the invention exhibit only a slight increase in melt flow index after repeated extrusion. Degradation reactions and decomposition of the polymer (chain breaking) causes an increase in the melt flow index.

The granules from the first extrusion step are subsequently converted into sheets (thickness 2 mm) at 220° C. in a press. These sheets are subjected to artificial ageing at 185° C. for up to 300 minutes in a fan-assisted oven, and the colour difference, based on a white standard, is determined in accordance with ASTM D 1925–70 (calculated in accordance with the formula: $\Delta E=(\Delta L^2+\Delta a^2 \Delta b^2)^{1/2}$ in the Hunter coordinate system, the yellowness index being calculated in accordance with the formula: $Y1=100(0.72a+1.79b)/L$) (Table 2).

TABLE 2

| | Stabilizer mixture | Colour difference ΔE after | | | |
| --- | --- | --- | --- | --- | --- |
| | | 0 | 60 | 180 | 300 min |
| — | no stabilizer | 59 | 65 | 66 | >100 |
| Ex. 1 | 0.06% AO-1 + 0.14% P-1 + 0.5% M-1 | 58 | 58 | 59 | 59 |
| Ex. 2 | 0.06% AO-1 + 0.14% P-1 + 1.0% M-1 | 58 | 58 | 59 | 59 |

The colour difference values show only a slight increase after artificial ageing for the recyclates stabilized according to the invention. The increase in the colour difference values indicates the increasing discoloration and decomposition of the samples.

Further test sheets are subjected to a conductivity test in accordance with DIN 53381-PVC/C (Table 3).

TABLE 3

| | Stabilizer mixture | Conductivity ($\mu$S) after | | |
| --- | --- | --- | --- | --- |
| | | 100 | 200 | min |
| — | no stabilizer | 140 | 198 | |
| Ex. 1 | 0.06% AO-1 + 0.14% P-1 + 0.5% M-1 | 6 | 108 | |
| Ex. 2 | 0.06% AO-1 + 0.14% P-1 + 1.0% M-1 | 4 | 76 | |
| Ex. 3 | 0.16% AO-1 + 0.04% P-1 + 0.5% M-1 | 50 | 119 | |

The values in Table 3 show a low conductivity after 100 and 200 minutes for the recyclates stabilized according to the invention, while a conductivity of 140 and 198 $\mu$S is measured for the unstabilized sample. Decomposition of the polymer causes an increase in conductivity.

The granules from the first extrusion step are in addition converted into sheets (thickness 2 mm) at 220° C. in an injection-moulding machine (Arburg 100). These sheets are subjected to artificial ageing at 135° C. in a fan-assisted oven until they become brittle

TABLE 4

Artificial ageing of used PP material (originating from battery casings)

| | Stabilizer mixture | Days before embrittlement |
|---|---|---|
| — | no stabilizer | 14 |
| Ex. 1 | 0.06% AO-1 + 0.14% P-1 + 0.50% M-1 | 94 |
| Ex. 2 | 0.06% AO-1 + 0.14% P-1 + 1.00% M-1 | 102 |
| Ex. 3 | 0.16% AO-1 + 0.04% P-1 + 0.50% M-1 | 95 |

EXAMPLES 4–12

Production waste of biaxially oriented PP (BOPP) is homogenized with the stabilizers (Table 5) in a mixer and subsequently extruded five times one after the other in a twin-screw compounder (temperature 230° C). The melt flow index (MFI, 230° C., 2.16 kg) is determined in accordance with DIN 53735M (ISO 1133/12) before the extrusions and after the 1st, 3rd and 5th extrusions.

TABLE 5

Repeated extrusion (temperature 230° C.) of BOPP production waste

| | Stabilizer mixture | 0 | 1st | 3rd | 5th extrusion |
|---|---|---|---|---|---|
| — | no stabilizer | 5.6 | 6.0 | 7.1 | 8.3 |
| Ex. 4 | 0.03% AO-1 + 0.07% P-1 + 0.1% M-1 | 5.6 | 5.5 | 5.5 | 6.3 |
| Ex. 5 | 0.06% AO-1 + 0.14% P-1 + 0.2% M-1 | 5.6 | 5.3 | 5.7 | 6.2 |
| Ex. 6 | 0.017% AO-1 + 0.017% P-1 + 0.166% M-1 | 5.6 | 5.7 | 6.3 | 7.2 |
| Ex. 7 | 0.034% AO-1 + 0.034% P-1 + 0.332% M-1 | 5.6 | 5.8 | 6.5 | 6.9 |
| Ex. 8 | 0.05% AO-1 + 0.05% P-1 + 0.1% M-1 | 5.6 | 5.6 | 6.1 | 6.6 |
| Ex. 9 | 0.1% AO-1 + 0.1% P-1 + 0.2% M-1 | 5.6 | 5.5 | 5.8 | 6.1 |
| Ex. 10 | 0.02% AO-1 + 0.01% P-1 + 0.04% F-1 + 0.03% M-1 | 5.6 | 6.1 | 6.5 | 7.0 |
| Ex. 11 | 0.04% AO-1 + 0.02% P-1 + 0.08% F-1 + 0.06% M-1 | 5.6 | 5.6 | 5.9 | 6.4 |
| Ex. 12 | 0.08% AO-1 + 0.04% P-1 + 0.16% F-1 + 0.12% M-1 | 5.6 | 5.5 | 5.8 | 6.0 |

The samples stabilized according to the invention exhibit only a slight increase in melt flow index after repeated extrusion. Degradation reactions and decomposition of the polymer (chain breaking) causes an increase in the melt flow index.

The granules from the 1st extrusion step are subsequently converted into sheets (thickness 2 mm) at 230° C. in an injection-moulding machine (Arburg 100). These sheets are subjected to artificial ageing at 135° C. in a fan-assisted oven until they become brittle (Table 6).

TABLE 6

Artificial ageing (temperature 135° C.) of BOPP production waste

| | Stabilizer mixture | Days before embrittlement |
|---|---|---|
| — | no stabilizer | 54 |
| Ex. 4 | 0.03% AO-1 + 0.07% P-1 + 0.1% M-1 | 76 |
| Ex. 5 | 0.06% AO-1 + 0.14% P-1 + 0.2% M-1 | 86 |
| Ex. 6 | 0.017% AO-1 + 0.017% P-1 + 0.166% M-1 | 80 |
| Ex. 7 | 0.034% AO-1 + 0.034% P-1 + 0.332% M-1 | 82 |
| Ex. 8 | 0.05% AO-1 + 0.05% P-1 + 0.1% M-1 | 84 |
| Ex. 9 | 0.1% AO-1 + 0.1% P-1 + 0.2% M-1 | 87 |
| Ex. 10 | 0.02% AO-1 + 0.01% P-1 + 0.04% F-1 + 0.03% M-1 | 77 |
| Ex. 11 | 0.04% AO-1 + 0.02% P-1 + 0.08% F-1 + 0.06% M-1 | 80 |
| Ex. 12 | 0.08% AO-1 + 0.04% P-1 + 0.16% F-1 + 0.12% M-1 | 83 |

Further test specimens are aged at 135° C. in a fan-assisted oven. Test specimens are taken after 500 hours, 1000 hours and 1500 hours in order to determine the tensile impact strength in accordance with DIN 53448 (Table 7).

TABLE 7

Tensile impact strength of BOPP production waste after artificial ageing (temperature 135° C.)

| | Stabilizer mixture | Tensile impact strength (kJ/m2) after | | |
|---|---|---|---|---|
| | | 500 h | 1000 h | 1500 h |
| — | no stabilizer | 644 | 480 | 0 |
| Ex. 4 | 0.03% AO-1 + 0.07% P-1 + 0.1% M-1 | 550 | 655 | 596 |
| Ex. 5 | 0.06% AO-1 + 0.14% P-1 + 0.2% M-1 | 550 | 560 | 571 |
| Ex. 6 | 0.017% AO-1 + 0.017% P-1 + 0.166% M-1 | 490 | 457 | 450 |
| Ex. 7 | 0.034% AO-1 + 0.034% P-1 + 0.332% M-1 | 476 | 579 | 565 |
| Ex. 8 | 0.05% AO-1 + 0.05% P-1 + 0.1% M-1 | 723 | 784 | 577 |
| Ex. 9 | 0.1% AO-1 + 0.1% P-1 + 0.2% M-1 | 807 | 709 | 823 |
| Ex. 10 | 0.02% AO-1 + 0.01% P-1 + 0.04% F-1 + 0.03% M-1 | 775 | 715 | 93 |
| Ex. 11 | 0.04% AO-1 + 0.02% P-1 + 0.08% F-1 + 0.06% M-1 | 757 | 728 | 578 |
| Ex. 12 | 0.08% AO-1 + 0.04% P-1 + 0.16% F-1 + 0.12% M-1 | 705 | 681 | 565 |

EXAMPLES 13–14

Used PP/EPDM material (originating from bumpers) is homogenized with the stabilizers (Table 8) in a mixer and is subsequently extruded five times one after the other in a twin-screw compounder (temperature 260° C). The melt flow index (MFI, 230° C, 2.16 kg) is determined in accordance with DIN 53735M (ISO 1133/12) after the 1st, 3rd and 5th extrusions.

TABLE 8

Repeated extrusion (temperatures 260° C.) of used PP/EPDM material (originating from bumpers)

| | | Melt flow index after | | |
|---|---|---|---|---|
| | Stabilization | 1st | 3rd extrusion | 5th |
| — | no stabilizer | 3.7 | 4.6 | 5.4 |
| — | 0.20 AO-1 + 0.20% P1 | 3.4 | 4.0 | 4.8 |
| Ex. 13 | 0.05% AO-1 + 0.05% P-1 + 0.10% M-1 | 3.8 | 3.9 | 4.3 |
| Ex. 14 | 0.10% AO-1 + 0.10% P-1 + 0.20% M-1 | 3.5 | 3.7 | 4.0 |

The samples stabilized according to the invention exhibit only a slight increase in the melt flow index after repeated extrusion. Degradation reactions and decomposition of the polymer cause an increase in the melt flow index.

EXAMPLES 15–18

36.6 g of used PP/EPDM material (originating from bumpers) are compounded for 30 minutes in a Brabender W50 mixing chamber held at 200° C. (40 rpm). The additives (Table 9) are introduced into the mixing chamber right at the beginning together with the plastic. After 30 minutes, the mixing is stopped, and the polymer material is removed from the mixing chamber and pre-pressed at 30° C. for 1 minute at 20 kN.

Sheets with a thickness of 2 mm are produced from this pressing at 200° C./50 kN.

After comminution, the melt flow index is determined on these sheets.

The samples stabilized according to the invention exhibit a smaller increase in the MFI value (Table 9) than the comparative example.

TABLE 9

Brabender experiment (200° C., 40 rpm, 30 min)
Used PP/EPDM material (originating from bumpers)

| | % | Additive | MFI (230/2.16) |
|---|---|---|---|
| — | — | none | 6.8 |
| Ex. 15 | 0.10/0.10/0.10 | AO-1/P-1/M-1 | 3.4 |
| Ex. 16 | 0.04/0.16/0.10 | AO-1/P-1/M-1 | 3.5 |
| Ex. 17 | 0.10/0.10/0.10 | AO-1/P-1/M-2 | 3.5 |
| Ex. 18 | 0.04/0.16/0.10 | AO-1/P-1/M-2 | 3.3 |

1 mm pressed sheet

EXAMPLES 19 and 20

45 g of the EPS (foam polystyrene) recyclate (granules) are compounded for 20 minutes in a Brabender W50 mixing chamber held at 220° C. (40 rpm). The additives (Table 10) are introduced into the mixing chamber right at the beginning together with the plastic mixture. After 20 minutes, the mixing is stopped, and the polymer material is removed from the mixing chamber and pre-pressed at 30° C. for 1 minute at 20 kN.

Sheets with a thickness of 2 mm are produced from this pressing at 200° C./150 kN.

After comminution, the melt volume index is determined on these sheets.

The samples stabilized according to the invention exhibit a smaller increase in the MVI value (Table 10) than the comparative example.

TABLE 10

Brabender experiment (20 min, 220° C., 40 rpm) with EPS recycled from packaging (granules)

| | | Additive | MVI (200/5) |
|---|---|---|---|
| — | — | none | 56.8 |
| Ex. 19 | 0.05/0.10/0.10 | AO-2/P-1/M-1 | 31.0 |
| Ex. 20 | 0.05/0.10/0.20 | AO-2/P-1/M-1 | 30.1 |

The following stabilizers are used in the above examples:

AO-1 Pentaerythrityl ester of β-(3,5-di-tert-butyl-4-hydroxyphenyl)propionic acid AO-2 benzenepropanoic acid 3-(1,1-dimethylethyl)4-hydroxy-5-methyl-1,2-ethanediylbis(oxy-2,1-ethanediyl) ester P-1 Tris-(2,4-di-tert-butylphenyl) phosphite M-1 Calcium oxide M-2 Calcium hydroxide F-1 Calcium stearate

What is claimed is:

1. A process for the stabilization of a single-material plastic recyclate, which comprises more than 98% by weight of only one polymer or copolymer, which are obtained from commercial and industrial waste, which consists essentially of adding to said plastic recyclate from 0.01 to 15% by weight, based on the plastic recyclate, of a mixture consisting essentially of a) a sterically hindered phenol which is the pentaerythrityl ester of β-(3,5-di-tert-butyl-4-hydroxyphenyl) propionic acid, b) tris(2,4-di-tert-butylphenyl) phosphite, and c) calcium oxide.

2. A process according to claim 1 wherein the a:b ratio is from 20:1 to 1:20, and the (a+b):c weight ratio is from 10:1 to 1:10.

3. A process according to claim 1 wherein the a:b ratio is from 10:1 to 1:10, and the (a+b):c weight ratio is from 5:1 to 1:10.

4. A process according to claim 1 wherein the plastic is a polyolefin.

5. A process according to claim 1 wherein the plastic is a polyethylene, polypropylene or a polypropylene copolymer.

6. A process according to claim 1 wherein from 0.05 to 5% by weight of the mixture of a, b and c is added to the plastic recyclate.

7. A process according to claim 1 wherein a lubricant is additionally added to the plastic recyclate.

8. A process according to claim 7 wherein the lubricant is calcium stearate.

9. A process according to claim 1 wherein a thiosynergist selected from the group consisting of the esters of thiodipropionic acid is additionally added to the plastic recyclate.

10. A process according to claim 1 wherein a thiosynergist selected from the group consisting the esters of thiodipropionic acid is additionally added to the plastic recyclate in an amount of from 0.1 to 1% by weight, based on the recyclate.

11. A process according to claim 1 wherein at least one light stabilizer selected from the group consisting of the benzophenones, benzotriazoles, oxanilides and sterically hindered amines is additionally added to the plastic recyclate.

12. A process according to claim 1 wherein at least one light stabilizer selected from the group consisting of the benzophenones, benzotriazoles, oxanilides and sterically hindered amines is additionally added to the plastic recyclate in an amount of from 0.01 to 2% by weight, based on the plastic recyclate.

13. A stabilizer mixture suitable for stabilizing single-material plastic recyclate which mixture consists essentially of per 100 parts (by weight)

as component a) 5–50 parts of the pentaerythrityl ester of β-(3,5-di-tert-butyl-4-hydroxy-phenyl)propionic acid, as component b) 5–50 parts of tris-(2,4-di-tert-butylphenyl) phosphite, and as component c) 5–90 parts of calcium oxide.

* * * * *